US006489738B1

(12) United States Patent
Bates et al.

(10) Patent No.: US 6,489,738 B1
(45) Date of Patent: *Dec. 3, 2002

(54) METHOD AND APPARATUS FOR PREDICTING FAILURE OF A DISK DRIVE

(75) Inventors: Randall Mason Bates, Byron; David Frederick Glaess, Rochester; Thomas Scott Larson, Altura; Patricia Joanne Wadkins, Rochester, all of MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/661,684

(22) Filed: Jun. 11, 1996

Related U.S. Application Data

(62) Division of application No. 08/391,313, filed on Feb. 17, 1995, now Pat. No. 5,557,183, which is a continuation of application No. 08/099,688, filed on Jul. 29, 1993, now abandoned.

(51) Int. Cl.[7] .................................................. H02P 3/00
(52) U.S. Cl. .......................................... 318/434; 361/23
(58) Field of Search ................................ 318/434, 568, 318/15; 361/23, 24, 28, 30, 31, 33, 86, 88, 91; 360/71, 73.01, 73.03, 73.04, 73.08, 74.1, 75, 77, 78.04, 78.05, 78.06; 364/474.17, 474.19

(56) References Cited

U.S. PATENT DOCUMENTS

| 4,383,208 A | * | 5/1983 | Nielson ........................ 318/618 |
| 4,525,763 A | * | 6/1985 | Hardy et al. ...................... 361/24 |
| 4,589,036 A | | 5/1986 | Bertschy et al. |
| 4,722,019 A | * | 1/1988 | Pohl ............................ 361/29 X |
| 4,817,045 A | * | 3/1989 | Faeser ........................ 361/23 X |
| 4,839,754 A | * | 6/1989 | Gami et al. ................. 360/73.01 |
| 4,882,671 A | * | 11/1989 | Graham et al. ............. 360/78.05 |
| 4,970,610 A | | 11/1990 | Knappe |
| 4,979,055 A | * | 12/1990 | Squires et al. ............. 360/78.04 |
| 4,982,298 A | * | 1/1991 | Volz et al. ................. 360/78.06 |
| 4,996,618 A | | 2/1991 | Kakuda |
| 5,018,029 A | | 5/1991 | Ekhoff et al. |
| 5,081,404 A | * | 1/1992 | Kelly et al. .................. 318/434 |
| 5,130,867 A | | 7/1992 | Ohashi |
| 5,197,018 A | * | 3/1993 | Oh .............................. 364/508 |
| 5,305,160 A | * | 4/1994 | Funches et al. ............ 360/78.06 |
| 5,407,265 A | * | 4/1995 | Hamidieh et al. ......... 364/474.1 |
| 5,557,183 A | * | 9/1996 | Bates et al. ................. 318/434 |

FOREIGN PATENT DOCUMENTS

| JP | 0242550 | 12/1985 |
| JP | 0295262 | 12/1987 |
| JP | 3090840 | 4/1991 |
| JP | 3105763 | 5/1991 |

\* cited by examiner

*Primary Examiner*—Jonathan Salata
(74) *Attorney, Agent, or Firm*—Matthew J. Bussan

(57) ABSTRACT

Disclosed is a disk drive having a spindle motor, a disk that is rotated by the spindle motor, and a movable actuator arm that carries a read/write head. The head physically engages a parked, or home, position at the Inner Diameter (ID) of the disk when the spindle motor is not energized and the disk is stationary. The electrical energization that must be applied to the spindle motor in order to breakaway the head from the disk (i.e., the breakaway current), and the energization that is necessary to cause the motor to achieve a stable spinning state (i.e., the spin current) are monitored. Possible future failure of the disk drive is predicted as a function of any changes in these two-electrical parameters, as these parameters may change over a period of time; i.e., may change over a number of disk drive stop/start events.

3 Claims, 4 Drawing Sheets

METHOD AND APPARATUS FOR PREDICTING FAILURE OF A DISK DRIVE

This application is a division of Ser. No. 08/391,313 filed Feb. 17, 1995 now U.S. Pat. No. 5,557,183 which is a continuation of Ser. No. 08/099,688 filed Jul. 29, 1993, now abandoned.

BACKGROUND OF THE INVENTION

1. Field of the Invention

This invention relates to the field of data storage using magnetic disk drives; for example, magnetic disk drive data storage. More specifically, the invention pertains to the field of predicting failure of a disk drive due to an increase in head to disk stiction, friction, and other physical phenomenon that affect the breakaway current and/or spin current of the disk drive's spindle motor

2. Description of the Prior Art

The spindle or disk drive motor (i.e., the motor that rotates the spindle on which disks are mounted) of a Direct Access Storage Device (DASD) must be provided with enough current to first break the heads of the device away from physical contact with the disks, and thereafter bring the spindle motor to a stable spin condition. If the spindle motor has insufficient power to break the heads free of the disk surfaces, or if the motor has insufficient power to bring the disks up to operational rotating speed, the disk drive will not operate properly.

As used herein, the term breakaway current is the magnitude of the spindle motor energization (for example, current) that is necessary to overcome stiction, and other forces that cause the head to adhere to the surface of a stationary disk, whereas the term spin energization is the magnitude of spindle motor energization that is required to achieve a stable spin velocity of the disks and the spindle motor. In many disk drives, the magnitudes of these two electrical parameters are equal; however, they are usually not of the same magnitude in that the magnitude of the spin parameter is usually lower than the magnitude of the breakaway parameter.

Stiction is an art term that is used to define the sticking of read/write transducing heads to a recording disk surface when the disk is stationary and the heads are in physical contact with the disk. Stiction resists disk movement when the spindle motor is energized. The problem of overcoming stiction has been addressed in the art.

The publication RESEARCH DISCLOSURE, September 1991, at page 662, describes an arrangement in which, in order to assist in overcoming stiction, the disk spin motor is energized at the resonant frequency of the spin motor and its associated apparatus.

In the publication JA 60-242550, it is suggested that the head be moved radially of the disk prior to stating to rotate the disk, and in publication JA 62-295262 if energization of the disk motor does not cause movement of the disk, then a carriage motor is energized.

The publication JP 3-90840 suggests a procedure for measuring head stiction by selective rotation of a disk, and publication JP 3-105763 suggests detecting the variation in friction between a magnetic head an a recording medium, and sending a warning when the percentage of the variation factor of the friction variation exceeds a preset slice level.

Other examples contained in the U.S. patent art are as follows, which patents are incorporated herein by reference to indicate the background of the invention and to illustrate the state of the art.

U.S. Pat. No. 4,589,036 describes a disk drive unit wherein on start up the head(s) is first moved radially outward of the disk. When it is detected that the head(s) has arrived at a predetermined radial position, rotation of the disk begins. Radial movement of the head continues until disk rotation increases to a predetermined speed.

U.S. Pat. No. 4,839,754 describes the use of switching-type regulator power supply connected to a brushless DC spindle motor wherein a shunt capacitor connected to the input of the power supply operates to apply maximum possible power to the motor during start up, thus overcoming stiction-friction forces.

U.S. Pat. No. 4,970,610 overcomes the disk/head stiction effect by applying a sequence of current pulses to the disk drive motor at a frequency close to the resonant frequency of the rotary spring-mass system that is formed by the stuck assembly of disks and head suspensions.

U.S. Pat. No. 4,996,618 provides that, upon power off, the heads are moved to a disk area that is near the Contact-Start-Stop (CSS) area. Later, when power is reapplied to the disk drive unit, and before the disk rotates, a head actuator is energized to move the heads into the CSS area.

U.S. Pat. No. 5,018,029 describes the use of force perturbations to reduce the effect of stiction. Once it is detected that stiction has been overcome, operating voltage is applied to the disk's spin motor.

U.S. Pat. No. 5,130,867 provides a piezoelectric actuator to load a head onto a disk so as to provide an operating range at a selected portion of a Stribeck diagram; i.e., a diagram that plots the friction coefficient between a head and a disk as a function of the rotational velocity of the disk.

While devices of the above type are generally useful for their intended purposes, the need remains in the art to detect or predict future disk drive failure by monitoring the electrical energization that must be applied to the spindle motor in order to cause the motor to begin to spin, and/or to cause the motor to achieve a stable spin state, wherein failure of the disk drive is predicted as a function of changes in one, or both, of these monitored electrical energizations. That is, a need remains for an insitu means for measuring and quantifying the stiction and friction present in a disk drive during use, and to use this information to alert the user to a potential failure problem before the problem actually occurs.

SUMMARY OF THE INVENTION

This invention predicts future failure of a disk drive due to a detected increase in head to disk stiction, and/or due to a detected increase in friction, and the like, that affects the ability of the drive's spindle motor to achieve a stable spin state. An increase in stiction/friction may occur as the disk drive is used in a data processing installation, for example, as the disk drive experiences a relatively large number of stop/start cycles over a period of time. More specifically, the invention provides a method and apparatus for predicting disk drive failure by periodically measuring the breakaway current and/or the spin current of a disk drive or spindle motor. The motor's breakaway current is the magnitude of the initial current that is required to overcome head/disk stiction and to thereby begin spinning the disk. The motor's spin current is the magnitude of current that is thereafter required to bring the motor up to a stable and reliable spinning state whereat data processing can reliably occur. Usually, the motor's spin current is of a lower magnitude than is its breakaway current. The invention responds to changes in breakaway current and/or spin current that may occur over a period of use, due for example, to repeated stop/start operations of the disk drive.

An object of the invention is to predict failure of a disk drive having a spindle motor, a disk that is rotated by the motor, and a head that physically engages the disk when the motor is not energized. The electrical energization that must be applied to the spin motor in order to cause head to breakaway from the disk and/or to cause the motor to begin to spin, and/or to achieve a reliable spinning state is monitored. Failure of the disk drive is predicated as a function of changes in these monitored electrical energizations.

As a feature of the invention, the rate of increase in these two motor energization parameters is compared to given magnitudes, and failure is predicted as a result of this comparison. This feature of the invention may also require that the number of disk drive stop/start operations exceed a given magnitude before the rates of increase of these two parameters are monitored.

These and other objects and advantages of the invention will be apparent to those of skill in the art upon reference to the following detailed description, which description makes reference to the drawing.

DETAILED DESCRIPTION OF THE PREFERRED EMBODIMENTS

This invention pertains to data storage using disk drives. In conventional disk drives, read/write heads, or transducers, are mounted on a movable actuator arm. The heads are moved to a desired disk cylinder, or track, by selective control or energization of an actuator motor. The disks are conventionally mounted on a spindle. The spindle is rotated at a substantially constant speed by operation of a spindle motor. The spindle usually supports a number of disks in a stack wherein all similar numbered tracks of the disks lie generally in alignment in what is called a cylinder. This invention finds utility in disk drives having one disk or multiple disks.

When disk drives of this general type are powered down (i.e., when they are turned off), it is conventional to move the head actuator arm to a parked or home position, usually near the Inner Diameter (ID), or perhaps near the Outer Diameter (OD) of the disks. Parking the heads takes place before the disks stop spinning.

Figure 1:
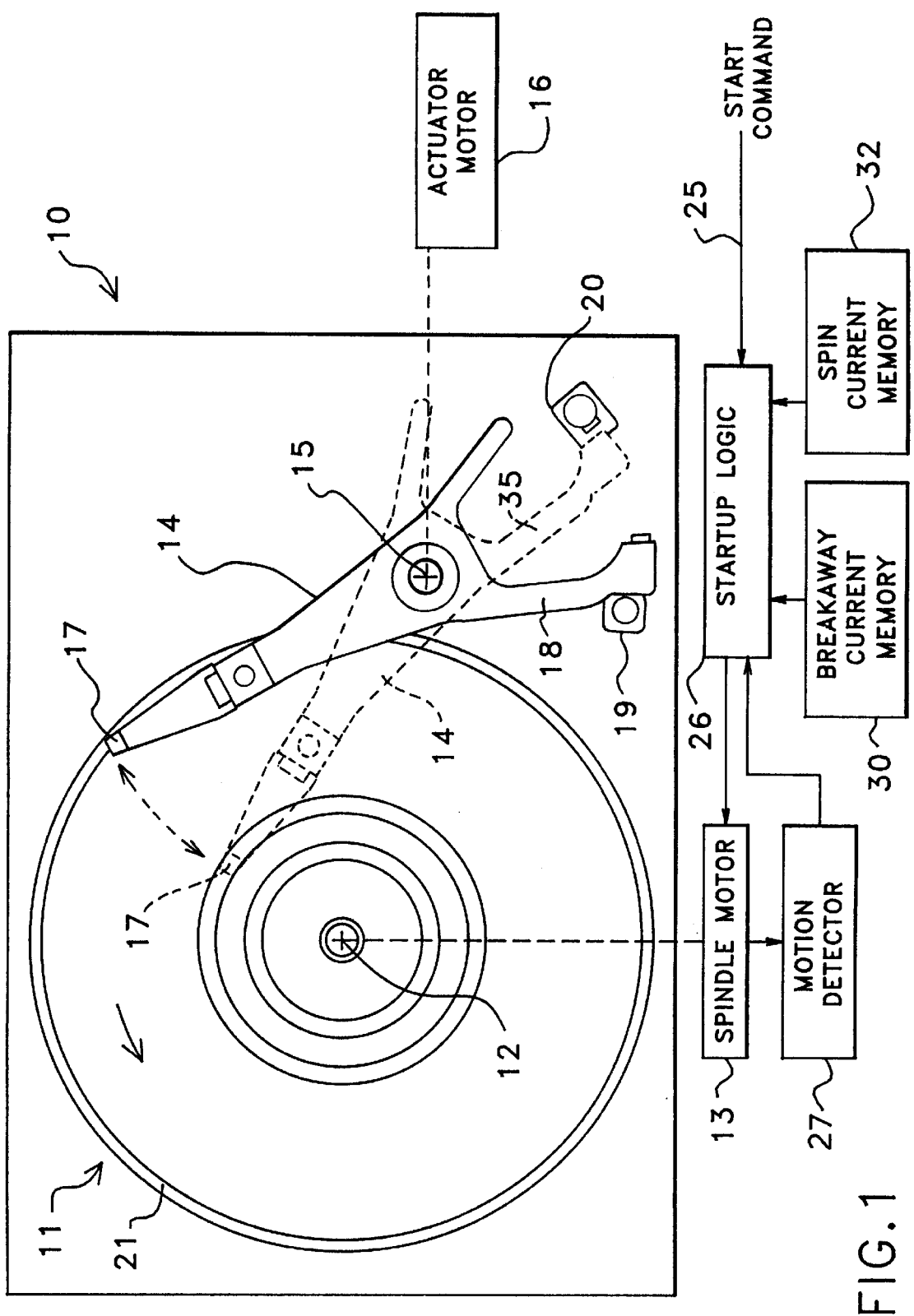
FIG. 1 is a simplified top view of a disk drive incorporating the invention.

FIG. 1 is a simplified top view of a disk drive 10, showing a disk 11, or a stack of disks 11, that rotate CCW about fixed spindle axis 12 by operation of spindle motor 13. The disk drive's head actuator arm 14 bidirectionally rotates about fixed pivot 15 by operation of actuator motor 16. Arm 14, and the heads 17 carried thereby, are shown in the extreme OD position wherein a portion 18 of arm 14 engages OD crash stop 19. In this state of arm 14, disks 11 are rotating at full operational speed by virtue of energization of motor 13. FIG. 1 shows actuator motor 16 as a rotary actuator, but other types of actuator motors can be used (for example, voice coil motors).

The dotted-line position of actuator arm 14 shows the portion 18 of arm 14 engaging ID crash stop 20, and shows heads 17 in their home or parked position adjacent to the disk's ID guardband 21. In this state of arm 14, disks 11 may be stationary and disk drive 10 is powered off.

This invention predicts failure of disk drive 10 due to a detected increase in the stiction that causes head 17 to adhere to the surface of disk 11 at the head's parked position, and thereby resist rotation of disk 11 when motor 13 is initially energized, as by a start command on conductor 25, and/or due to a detected increase in friction, and the like, that operates to prevent motor 13 from achieving a stable spin state whereat data processing can reliably take place.

More specifically, the invention provides startup logic 26 that operates to predict failure of disk drive 10 by measuring the breakaway current and/or the spin current of motor 13; i.e., the current that is required to overcome head/disk stiction and begin spinning disk 10, and to thereafter overcome friction, and the like, to bring motor 13 and disk 11 up to a stable and reliable spinning state whereat data processing can reliably occur.

For purposes of convenience, the means by which motor 13 is energized to maintain the stable and reliable spinning state is not shown. A variety of such means are well known to those of skill in the art, and the selected means will vary depending upon the type of motor that is selected for motor 13. It suffices to say that motion detector 27 can be used with such a means to maintain the spinning state of motor 13 by operation of a well-known servomechanism.

Periodically, during use of disk drive 10 in data processing, and perhaps at every such off/on use of disk drive 10, logic 26 operates to compare a measured breakaway current and/or spin current to previously stored values of these two currents, as these two currents were measured at the time of manufacture of disk drive 10. Motion detector 27 enables logic 26 to determine both the breakaway state and the stable spinning state of motor 13.

Figure 2:
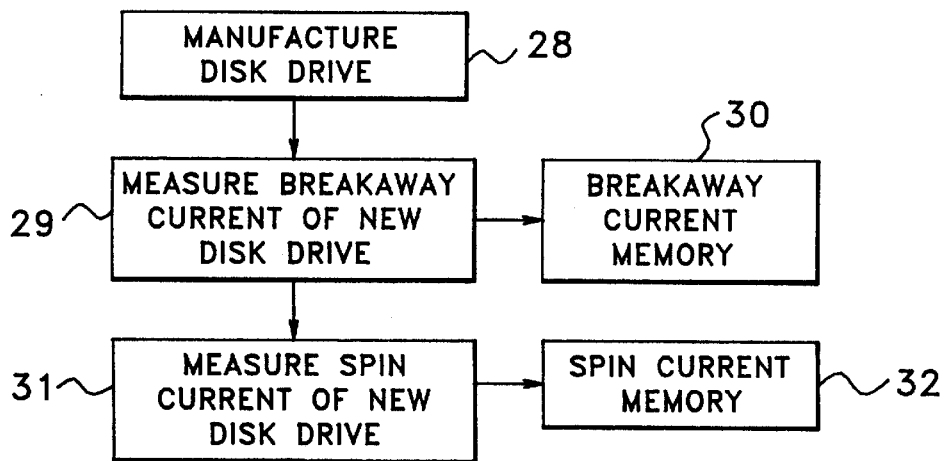
FIG. 2 is a flowchart showing a process, in accordance with the invention whereby the disk drive of FIG. 1 is manufactured, and thereafter the new disk drive's breakaway current and spin current are measured and stored in a breakaway current memory and a spin current memory that are a part of the disk drive.
Figure 6:
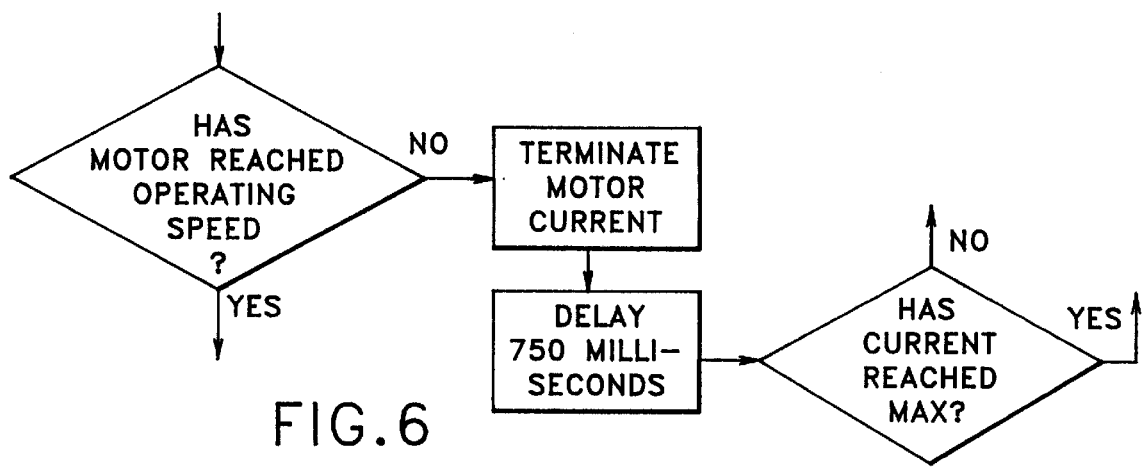
FIG. 6 is a flowchart showing a variation of FIG. 3.

The manner of manufacturing disk drive 10, and the manner of measuring the breakaway current and the spin current of a newly-manufactured disk drive 10 are not critical to the invention. As those skilled in the art will appreciate, many well known and acceptable means of manufacture, motion detection, and current measurement are available. FIG. 2 is a flowchart showing such a process. The manufacture of disk drive 10 is indicated by event 28. After disk drive 10 has been manufactured, its breakaway current is measured at event 29. This measured value of breakaway current is then stored in a breakaway current memory 30 that is a part of disk drive 10. Thereafter, at event 31, the spin current of this newly-manufactured disk drive 10 is measured, and this measured value of spin current is stored in a spin current memory 32 that is a part of disk drive 10.

As will be appreciated by those of skill in the art, startup logic 26 of FIG. 1 may take a wide variety of forms, and its specific construction and arrangement is not critical to the invention. For example, startup logic 26 may comprise discrete logic elements that are interconnected to control spindle motor 13 in the desired manner or, alternatively, startup logic 26 may comprise a control processor that is programmed to control spindle motor 13 in the desired manner. In addition, motor 13 may take a number of forms, including, for example, a DC motor or a brushless DC motor.

For these reasons, the invention will be described in general terms to thus enable those skilled in the art to practice the invention while choosing from well-known logic means and motors.

Figure 3:
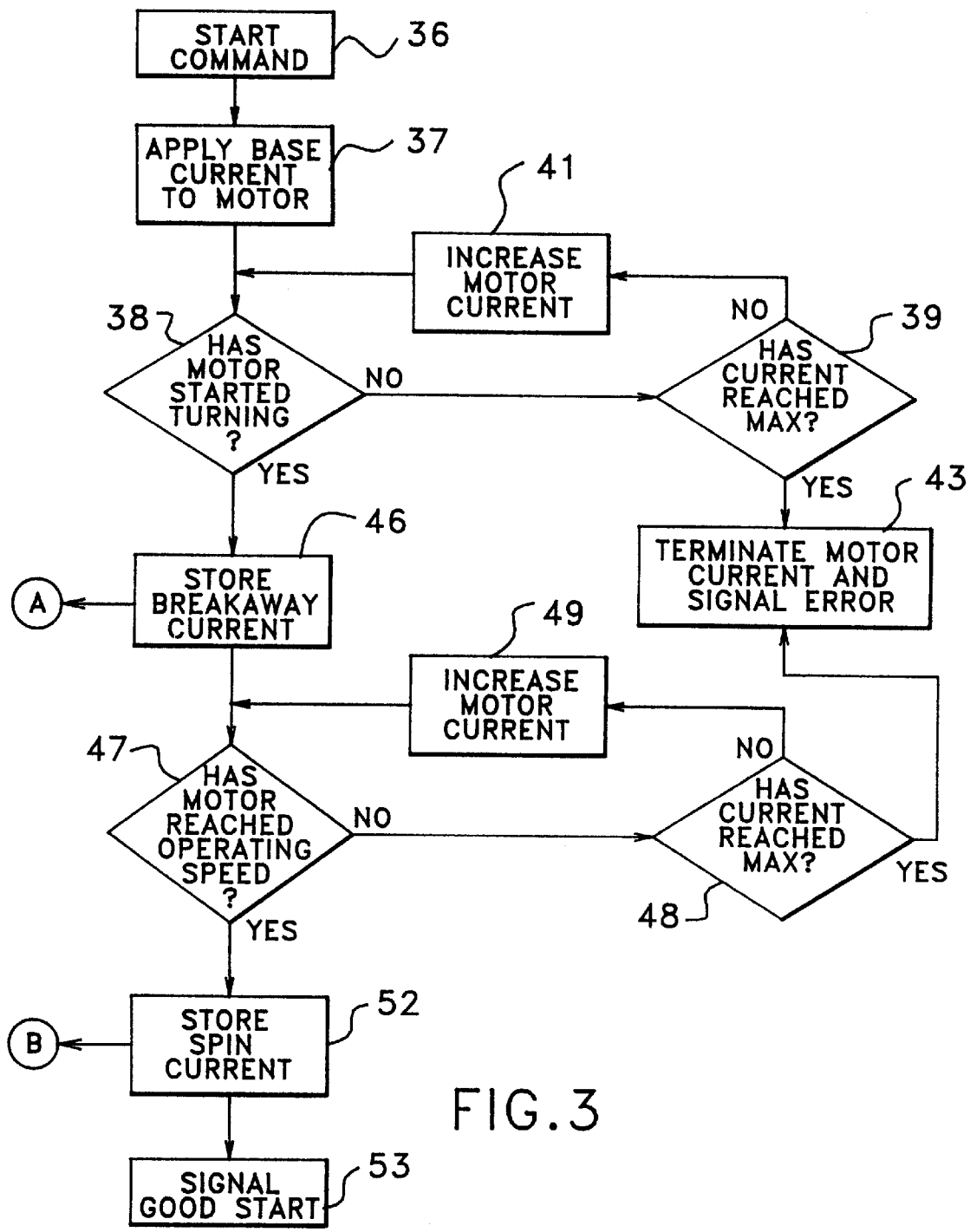
FIG. 3 is a flowchart showing the startup logic that is contained within the disk drive of FIG. 1, this flowchart showing how the startup logic periodically measures and then stores the disk drive's breakaway current and spin current during data processing use of the disk drive.

FIG. 3 is a flowchart showing startup logic 26 contained within disk drive 10 of FIG. 1, this flowchart showing how startup logic 26 periodically measures, and then stores, the disk drive's breakaway current and spin current during data processing use of disk drive 10. In an embodiment of the invention, startup logic 26 operates to perform its various functions, to be described, upon the occurrence of ever disk drive stop/start event. While the term current will be used in the following description, it is appreciated that, more broadly, it is the measurement of an electrical energization parameter of motor 13 that is critical to the invention.

Operation of startup logic 26 begins upon the occurrence of a start command, as indicated at function 36 of FIG. 3 (also see conductor 25 of FIG. 1). The first event to occur thereafter is the application of a base current to spindle motor 13, see function box 37. The magnitude of this base current may, for example, be the current magnitude that was stored in breakaway current memory 30 at the time of manufacture of disk drive 10.

Shortly thereafter, function 38 operates in conjunction with motion detector 27 to determine if motor 13 has started to turn. If motor motion is not detected, function 39 determines if the current being supplied to motor 13 has reached a predefined maximum value. If no maximum has been reached, motor current is increased at box 41, and function 38 again tests to see if motor 13 has started to turn. When multiple operations of function 41 produce a predefined current maximum for motor 13, function 43 is enabled to terminate current to motor 13, and to signal a start error to the disk drive user or to a data processing installation that includes disk drive 10.

Figure 7:
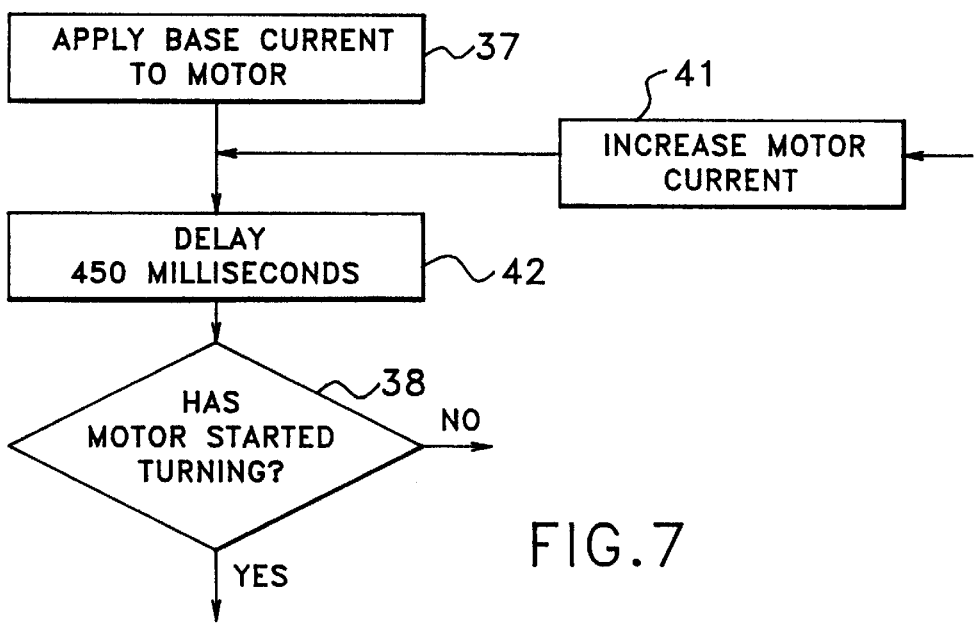
FIG. 7 is a flowchart showing another variation of FIG. 3.

Turning now to FIG. 7, it may be desirable to provide a delay between the initial application of the base current to motor 13, or the application of an increased magnitude current to motor 13, and the testing for motor motion. FIG. 7 shows a delay function 42 of about 450 milliseconds interposed before the operation of function 38 occurs.

Assuming that motor 13 has started to turn, as indicated to logic 26 by the output of motion detector 27, function 46 is enabled to store the value of the breakaway current that succeeded in breaking head 17 away from the surface of disk 11. This breakaway current value is stored, for example, in memory 30 that is located within disk drive 10.

After turning of motor 13 has been detected, function 47 operates to determine if motor 13 has reached operating speed whereat the spinning of disk 11 has been stabilized at a constant speed or velocity such that data processing can begin. Again, function 47 is achieved using the output of motion detector 27 as an input to startup logic 26. If operating speed has not been achieved, function 48 operates to determine if the current to motor 13 has reached a predefined maximum value. If it has not, function 49 operates to increase the current to motor 13, and function 47 again tests to see if the motor has achieved operating speed. When multiple operations of function 49 produces a predefined spin current maximum for motor 13, function 43 is enabled to terminate current to motor 13 and to signal a start error.

Again, it may be desirable to provide a delay between the application of an increased current to motor 13 by operation of function 49 and the testing for operating speed. An arrangement, as shown at 42 in FIG. 7, may be used to interpose a delay prior to function 47.

When startup logic 26 determines that motor 26 has reached operating speed, or velocity, then function 52 is enabled to store the spin current value that achieved the operational speed. A good start has now been achieved, and this fact is indicated by function 53 of logic 26.

Figure 4:
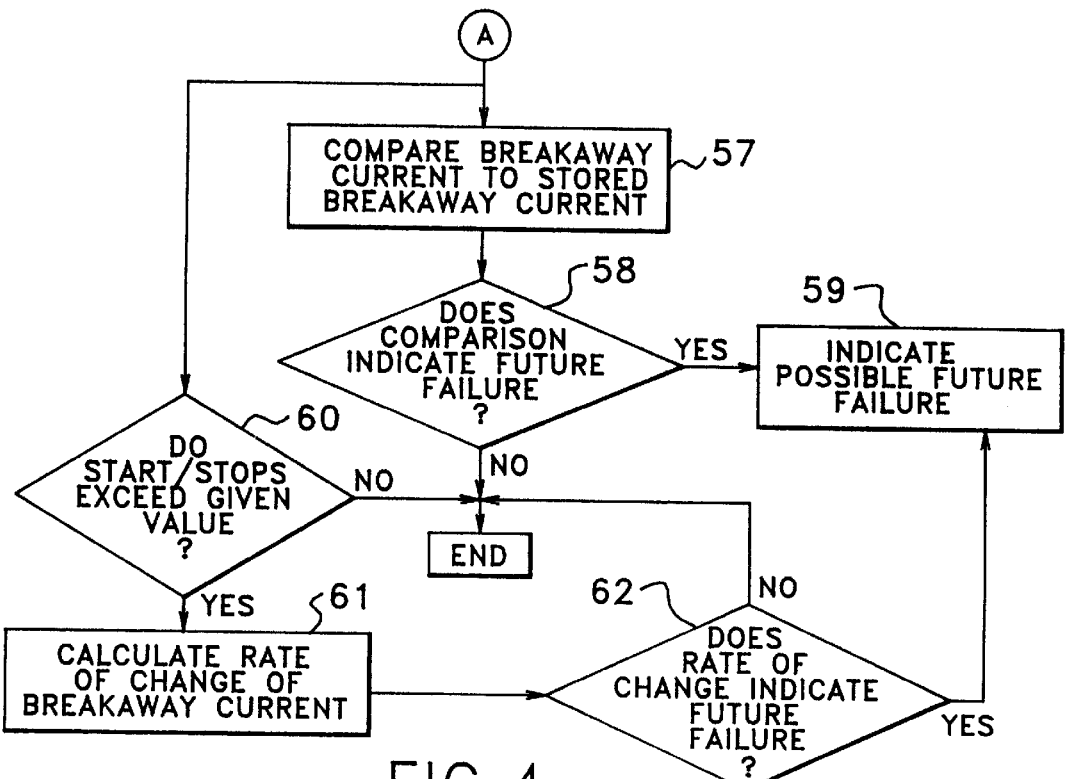
FIG. 4 is a flowchart showing the startup logic that is contained within the disk drive of FIG. 1, this flowchart showing how the startup logic periodically operates to indicate possible future failure of the disk drive of FIG. 1 by responding to the breakaway current that is measured in FIG. 3.

With reference to FIG. 4, when logic function 46 has stored the magnitude of the breakaway current, logic function 57 operates to compare that magnitude to the magnitude of the breakaway current that was stored in memory 30 at the time of manufacture of disk drive 10 (see FIG. 2). Function 57 determines if this comparison indicates a future failure of disk drive 10. If such a future failure is indicated, then function 59 provides such an indication to the disk drive user. Another indication of impending failure may be the rate at which the breakaway current increases with use of disk drive 10. However, it is generally not necessary to perform such a test until the disk drive has been used for a period of time in data processing. Thus, function 60 enables function 61 only when disk drive stop/start events exceed a given value, for example 30 events. If function 62 determines that the rate of change of the breakaway current indicates a possible future failure, then indication function 59 is enabled.

Figure 5:
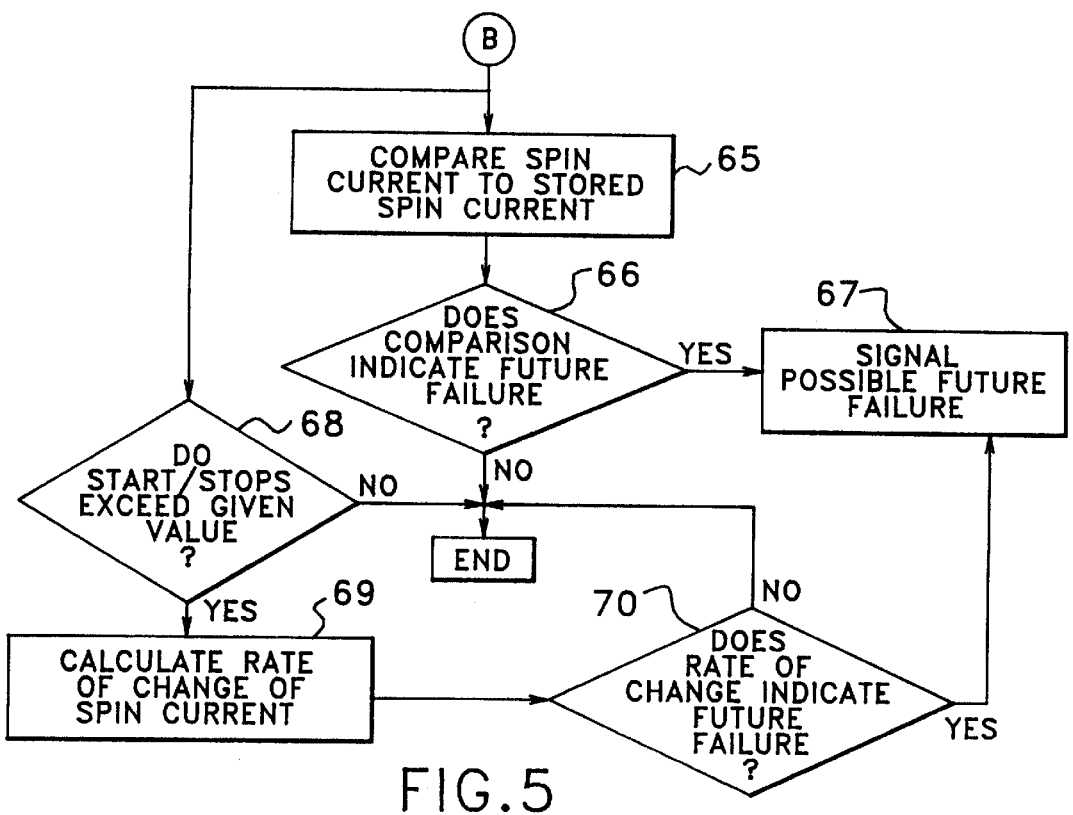
FIG. 5 is a flowchart showing the startup logic that is contained within the disk drive of FIG. 1, this flowchart showing how the startup logic periodically operates to indicate possible future failure of the disk drive of FIG. 1 by responding to the spin current that is measured in FIG. 3.

With reference to FIG. 5, when logic function 52 of FIG. 3 has stored the magnitude of the spin current, logic function 65 operates to compare this magnitude to the magnitude of the spin current that was stored at 32 at the time of manufacture of disk drive 10 (see FIG. 2). Function 66 determines if this comparison indicates a future failure of disk drive 10. If such a future failure is indicated, then function 67 provides an indication to the disk drive user. Another indication of impending failure may be the rate at which the spin current increases with use of disk drive 10. However, it is generally not necessary to perform such a test until disk drive 10 has been used for a period of time in data processing. Thus, function 68 enables function 69 only when disk drive 10 stop/start events exceed a given value, for example 30 events. If function 70 determines that the rate of change of spin current indicates a possible future failure, then indication function 67 is enabled.

As can be seen from the above detailed description of preferred embodiments of the invention, the invention provides the detection of possible future disk drive failure by monitoring the electrical energization that is applied to the spindle motor in order to cause the motor to begin to spin, and/or to cause the motor to achieve a stable rotation state. Failure of the disk drive is predicted as a function of changes in one, or both, of these monitored electrical energizations. Thus, an insitu means is provided for measuring and quantifying the stiction and friction present in a disk drive during use, and this information is used to alert the disk drive user to a potential failure problem before the problem occurs.

It will be appreciated that those of skill in the art will readily visualize other embodiments of the invention. Thus, it is intended that this detailed description not be taken as a limitation on the spirit and scope of the invention.

What is claimed is:

1. A method for predicting failure of a disk drive, comprising the steps of;

manufacturing a disk drive having an electrical spindle motor, a disk that is rotated by said motor, and a head that physically engages and adheres to said disk by head/disk stiction when said motor is not energized;

determining during said manufacturing step a breakaway electrical energization parameter that must be applied to said motor to overcome said head/disk stiction;

storing said breakaway electrical energization parameter determined during said manufacturing step;

periodically determining during data processing use of said disk drive a breakaway electrical energization parameter that must be applied to said motor to overcome head/disk stiction;

comparing said stored breakaway electrical energization parameter determined during said manufacturing step to said breakaway electrical energization parameter periodically determined during data processing use; and predicting the possibility of a future failure of said disk drive as a function of said comparison.

2. Apparatus for predicting failure of a disk drive having a motor, a disk that is rotated by said motor, a head that physically engages and adheres to said disk by head/disk stiction when said motor is not energized, and a memory containing a reference motor breakaway electrical energization parameter that was operable to overcome head/disk stiction during the manufacture of said disk drive, said apparatus comprising;

a motion detector providing an output signal in response to rotation of said disk by said motor;

startup logic coupled to said motion detector and responsive to said output signal, said startup logic periodically monitoring a motor breakaway electrical energization parameter that is presently operable to overcome said head/disk stiction and thereby cause said motion detector to provide said output signal, and said startup logic predicting the possibility of a future failure of said disk drive as a function of said reference motor breakaway electrical energization parameter and said presently monitored motor breakaway electrical energization parameter.

3. A disk drive, comprising:

a motor;

a disk that is rotated by said motor;

a head that physically engages and adheres to said disk by head/disk stiction when said motor is not energized; and a preventive diagnostic apparatus including a memory containing a reference motor breakaway electrical energization parameter that was operable to overcome head/disk stiction during the manufacture of said disk drive a motion detector providing an output signal in response to rotation of said disk by said motor startup logic coupled to said motion detector and responsive to said output signal, said startup logic periodically monitoring a motor breakaway electrical energization parameter that is presently operable to overcome said head/disk stiction and thereby cause said motion detector to provide said output signal, and said startup logic predicting the possibility of a future failure of said disk drive as a function of said reference motor breakaway electrical energization parameter and said presently monitored motor breakaway electrical energization parameter.

* * * * *